Sept. 6, 1960  H. H. RACHFORD, JR  2,951,367
PROCESS FOR DETERMINING FLUIDS IN BEDS
TRAVERSED BY DRILL HOLES
Filed Aug. 21, 1957  2 Sheets-Sheet 2

INVENTOR.
HENRY H. RACHFORD JR.,
BY Frank S. Troidl
ATTORNEY.

United States Patent Office 2,951,367
Patented Sept. 6, 1960

2,951,367

PROCESS FOR DETERMINING FLUIDS IN BEDS TRAVERSED BY DRILL HOLES

Henry H. Rachford, Jr., Orleans Parish, La., assignor, by mesne assignments, to Jersey Production Research Company, Tulsa, Okla., a corporation of Delaware Filed Aug. 21, 1957, Ser. No. 679,485

3 Claims. (Cl. 73—154)

This invention is a new method for determining the kinds of fluids, such as gases and liquids, contained within porous formations traversed by a borehole.

It is known to determine the level of porous beds and separate the porous beds from the impermeable beds by measuring the thermal conductivity of the porous and impermeable beds traversed by the borehole. The permeable beds transmit heat very rapidly and thus have a very high apparent thermal conductivity in relation to the non-permeable beds. Therefore, if temperature measurements of a liquid having a different temperature from the fluids in the borehole are made at certain times after the circulation of the liquid has stopped, temperature diagrams will be obtained on which the porous beds are marked by relatively warmer zones whereby they can be identified. An example of this known method can be found by reference to Patent No. 2,242,612, issued to E. G. Leonardon on May 20, 1941.

The known methods of determining the location of various permeable beds employ a liquid which is at a different temperature from the fluids expected in the beds. The liquids thus used change the temperature of the fluids within the beds but do not change the physical state of the fluids. The only information which therefore can be obtained by using known methods is whether a particular bed is porous or impermeable; the known methods do not give, in addition, an indication of the particular fluids contained within the porous formations.

It is an object of this invention, therefore, to provide an indication not only of the location of porous and impermeable beds traversed by a borehole, but also qualitative and quantitative indications of the particular fluids contained in the porous formations.

Briefly described, my new method consists of placing in the borehole a material sufficiently different in temperature from the natural temperature of the beds to change the physical state of the fluids adjacent the borehole. This method is in contrast with known methods which only change the natural temperatures of the fluids in the beds while leaving the fluids in the same natural physical state. After the physical state of the fluids in the beds has been changed, the material is removed and temperature measurements are taken at different depths in the borehole as the fluids adjacent the borehole return to their original state. The temperature at which the various fluids return to their original state is determined by a temperature-time curve which may be plotted from the temperature readings. Noting the temperature at which particular fluids in particular beds have returned to their original state, the fluids in the beds are identified.

Figure 1:
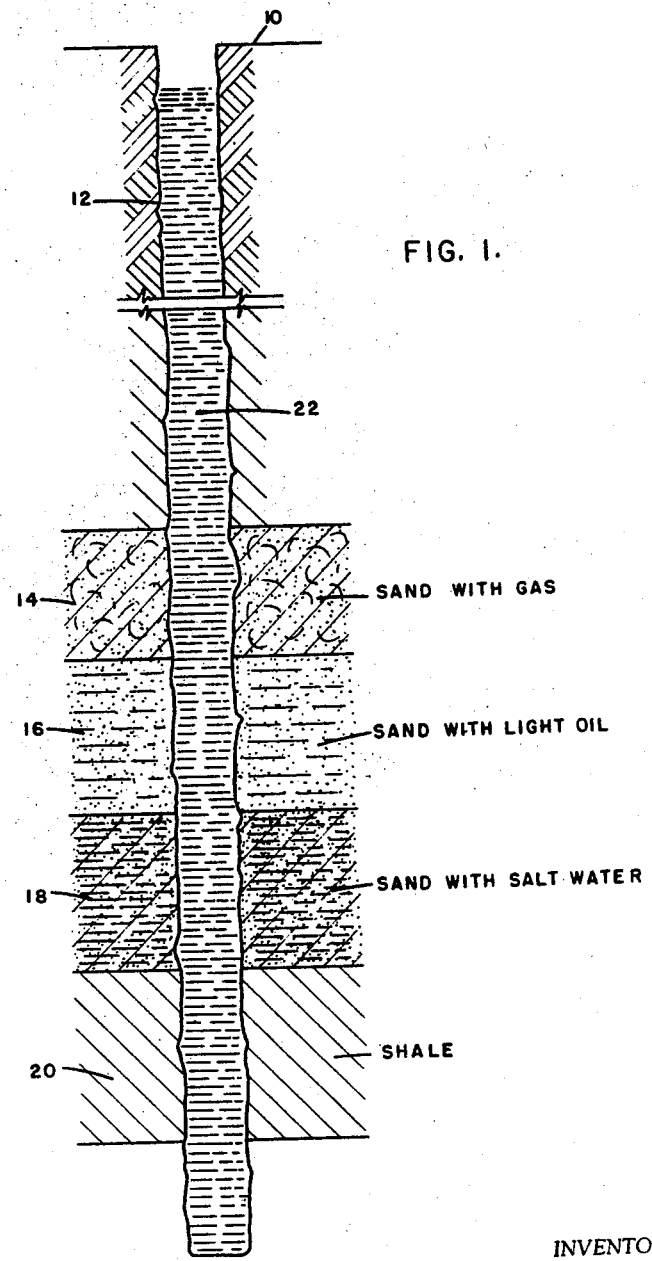
Fig. 1 is a sectional view showing a plurality of beds containing different types of fluids which are traversed by a borehole.

Referring to the drawings, and more particularly to Fig. 1, numeral 10 refers to the surface of the earth in which has been drilled a borehole 12. The borehole 12 traverses a series of permeable formations 14, 16, and 18 and a relatively impermeable formation 20, such as shale.

For purposes of explaining the operation of my new method of determining the kinds and quantity of fluids, including both gases and liquids, in the beds adjacent a borehole, it is assumed that bed 14 is a sand filled with gas, bed 16 is a sand filled with light oil, and bed 18 is a sand filled with salt water. Generally, the various fluids contained in subsurface rocks of interest are composed of water and a large variety of hydrocarbons. The water is usually mildly to strongly saline, and the hydrocarbons may be gases or liquid. The gases may be lean, i.e., contain mostly methane or rich, i.e., contain relatively large quantities of materials having a high molecular weight. In general, the properties such as the freezing point and latent heats of fusion of the liquid hydrocarbons and the dew point and heat of condensation of gaseous hydrocarbons will be substantially different from the freezing point and latent heat of fusion of salt water. Also, the freezing point and latent heats of fusion of liquid hydrocarbons differ according to the molecular composition of the liquid hydrocarbons, and the dew point and heat of condensation of the various gaseous hydrocarbons also differ according to their molecular composition.

I utilize the foregoing physical properties by placing in the borehole 12 a material 22 having a temperature sufficiently different from the natural temperatures of the fluids such as the liquids and gases in the subsurface beds to change the physical state of these fluids. This liquid preferably is a freezing mixture which is of a sufficiently low temperature to change the liquids and gases adjacent the borehole to solids and liquids, respectively. The freezing mixture may be any suitable mixture, such as calcium chloride solution, liquid ammonia, liquid methane, liquid carbon dioxide, liquid nitrogen, or the like. This suitable freezing mixture, when introduced in the well bore, causes solidification of appreciable quantities of the liquids and/or condensation of appreciable quantities of gases present within the porous structure of the subsurface rocks and initiates a wave or front at which a phase change occurs. This front is propagated radially outward at a rate and to a distance which depends on (1) the freezing point of the liquid or the dew point of the gas, (2) the latent heat of fusion for the liquid or of condensation of the gas, (3) the relation between freezing point and fraction of liquid frozen or the dew point and fraction of gas condensed, (4) the temperature of the applied freezing mixture, (5) the initial temperature of the formation, (6) the heat conductivity of the rock-liquid-solid or rock-gas-liquid mixture, and (7) changes in density which accompany phase changes and thereby produce bulk flow.

Figure 2:
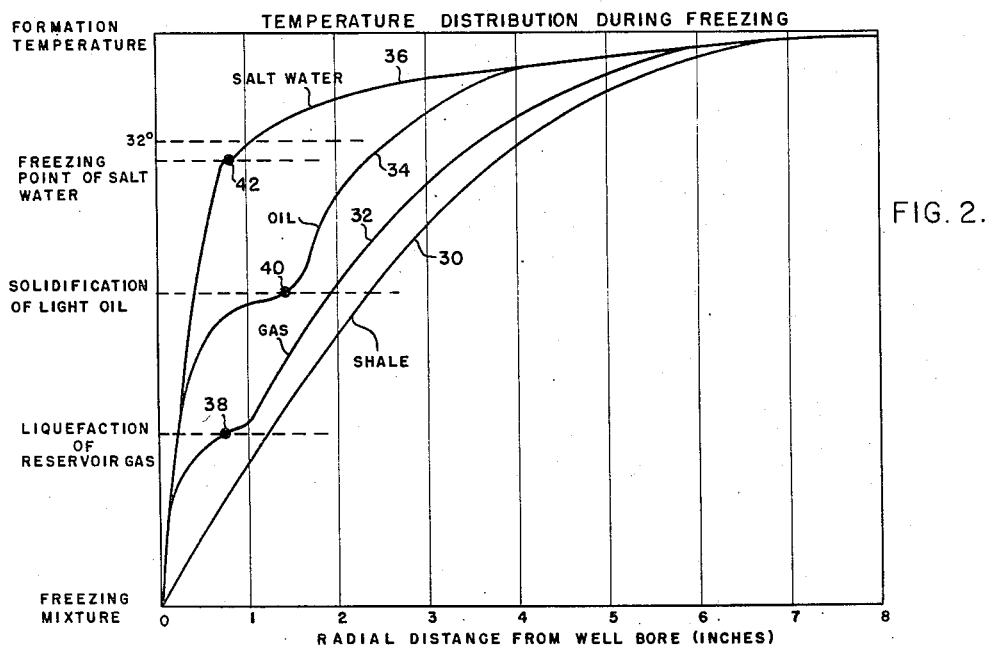
Fig. 2 is a temperature-radial distance from the well bore graph showing the relationship of the temperature and distance from the well bore of various fluids during a freezing operation.

The freezing mixture 22 as shown in Fig. 1, after it has been allowed to set in the borehole 12 for a time sufficient to change the state of the liquids and gases, may produce a temperature-radial distance from the well bore curve similar to the curves shown in Fig. 2. Curve 30 represents a typical temperature distribution for a relatively non-porous bed 20, curve 32 a typical distribution for a sand filled with gas such as bed 14, curve 34 a typical distribution for a sand filled with light oil such as bed 16, and curve 36 a typical distribution for a sand filled with salt water such as bed 18.

Referring to Fig. 2, it can be seen that all of the curves show that during the freezing cycle, the temperatures of all of the beds continually increase with distance from the bore up to the temperature of the undisturbed formation. The liquefaction of the reservoir gas occurs for a radial distance indicated by point 38, the solidification of light oils occurs for a radial distance indicated by point 40, and the solidification of the salt water occurs for a radial distance indicated by point 42. The distance at which the changes in state of the liquids and gases occur and the time necessary to cause this change will of course vary according to the diameter of the borehole, the temperature and pressure of the formations initially, the material being frozen, and the temperature of the freezing mixture. The curves shown in Fig. 2 are typical of the temperature distribution to be expected in an 8 inch diameter well bore and bed temperatures of 150° F. using liquid methane at 100 p.s.i. and −148° C. Under these conditions, the freezing mixture should be left within the borehole for a sufficient time that the freezing wave will penetrate the invaded zone adjacent to the borehole and extend into the undisturbed fluids within the formation. This period will depend upon the extent of invasion, the temperature of the freezing mixture and of the formation, and the thermal conductivity. A period ranging up to three hours usually is sufficient.

After the liquids have been frozen and the gases condensed, the freezing mixture is removed. Thereafter, temperature traverses of the borehole are obtained. The temperature measurements may be made with any conventional temperature measuring means well known in the art, such as conventional wire line temperature bombs or remote indicating thermometers or thermocouples, which may be lowered into the well bore with the varying temperatures being indicated at the surface by changes in voltage or current flow.

Figure 3:
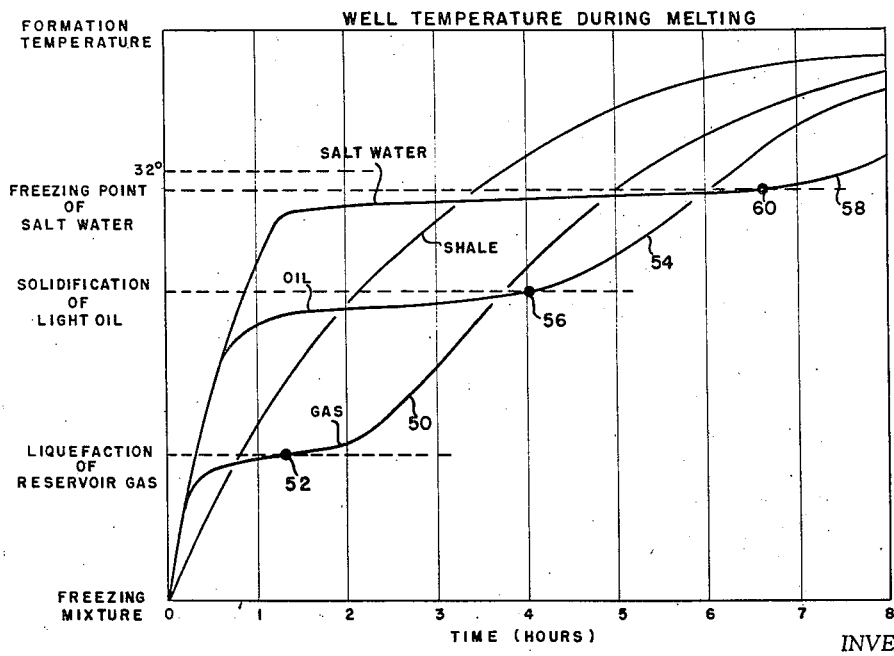
Fig. 3 is a temperature-time graph showing the relationship of the temperature with time of the various fluids during the return of the fluids to their original state.

Fig. 3 shows a temperature-time curve during the change of the various fluids contained in the formations back to their original physical state, i.e., the change of the liquids which had been frozen back to a liquid, and the change of the gases which had been condensed back to a gas. The significant feature of these curves is the plateau and inflection on the curve. The temperature at which the inflection occurs is at the melting point of the liquid in the sand or the condensation point of the gases in the sand. For example, the condensation of the gases represented by gas curve 50 is indicated by the inflection occurring at point 52, the solidification point of a light oil represented by curve 54 by the inflection occurring at point 56, and the freezing point of salt water represented by curve 58 at the inflection indicated by point 60.

The length of the plateau is related to the thermal conductivity of the beds, to the saturation of the fluids and gases, and to the heat of fusion of the material which saturates the sand. Quantitative determination of the amounts of fluids and gases that are present in the rock may be computed mathematically by well known methods. This involves solving the differential equation for unsteady-state heat transfer with a moving boundary condition which arises because of the melting or freezing process. In this equation the following quantities appear: (1) ratio of the effective specific heat to the thermal conductivity, ($a$) in the liquid zone and ($b$) in the frozen zone, and (2) the ratio of the effective specific heat to the latent heat of the freezing process. The effective values of each of these ratios depend on the kind of fluid present in the rock pores and the weight of the fluid present relative to the weight of the rock in which it is contained. If the freezing point, latent heat, specific heats, and conductivities of the fluid substance and the rock, as well as the relative weights of each be assumed, then the proper effective values for the quantities in the unsteady state heat transfer equation can be calculated from weight averages of these properties. The temperature history to be expected at the well bore during the freezing-melting cycle can be predicted using any of several published techniques. One such technique is disclosed in an article by P. A. Longwell entitled, "A Graphic Method for Solution of Freezing Problems," AIChE Journal, vol. 4, No. 1, March 1958, p. 53. Then if for these assumed properties and assumed relative weights of liquid and rock the observed history of temperature variation is not matched, the correct assumptions must be arrived at by trial and error. Since the freezing point (which has been shown by experiment to show up clearly as a long plateau on a time-temperature plot) qualitatively classifies the fluid as to water-oil-gas, and the type of rock is usually known from other sources good trial values for the ratios of specific heats of conductivities, and latent heats can thus be chosen. The only significant trial-and-error that must be carried out in many cases is to find the relative amounts of fluid and rock, i.e., the fluid saturation porosity product, a very valuable quantity to be determined by a logging technique.

It can be seen, therefore, that I have invented a new method for determining quantitatively and qualitatively the phase change temperature, the heat of fusion, and the physical state of fluids in subsurface formations from which the presence of oil, gas, and salt water can be detected. This is done by noting the temperature versus time path by which the chilled fluid returns to its initial physical state after its physical state has been changed by a material introduced into a borehole.

I claim:

1. A process for the determination of the kinds of fluids in the beds traversed by a borehole comprising: placing in the borehole a liquid having a temperature sufficiently different from the natural temperature of the beds to change the physical state of the fluids adjacent the borehole, the material being left in the borehole for a sufficient length of time to effect said change in physical state; removing the material, and subsequently taking a plurality of temperature measurements at each of different depths in the borehole as the fluids adjacent the borehole return to their original state, whereby the fluids in the beds may be identified.

2. A process in accordance with claim 1 wherein the liquid is a freezing mixture.

3. A process for the determination of the approximate composition of gases and liquids in beds traversed by a borehole comprising in sequence: placing in the borehole a freezing mixture having a temperature sufficiently low to change any liquids and any gases adjacent the borehole to solids and liquids, respectively, the freezing mixture being left in the borehole for a sufficient length of time to effect said change; removing the freezing mixture; and taking a series of temperature measurements at each of different depths in the borehole as the solids and liquids return to their natural state as liquids and gases, respectively, whereby the liquids and gases in the beds may be identified.

References Cited in the file of this patent

UNITED STATES PATENTS

| 1,307,601 | Saunders | June 24, 1919 |
| 2,290,075 | Schlumberger | July 14, 1942 |